Jan. 31, 1956  H. H. ENGEMANN  2,732,832
VALVE LIFTER
Filed April 4, 1952
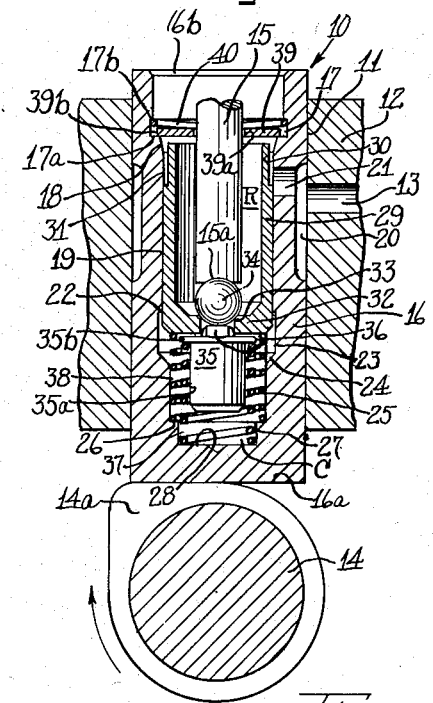
Fig. 1
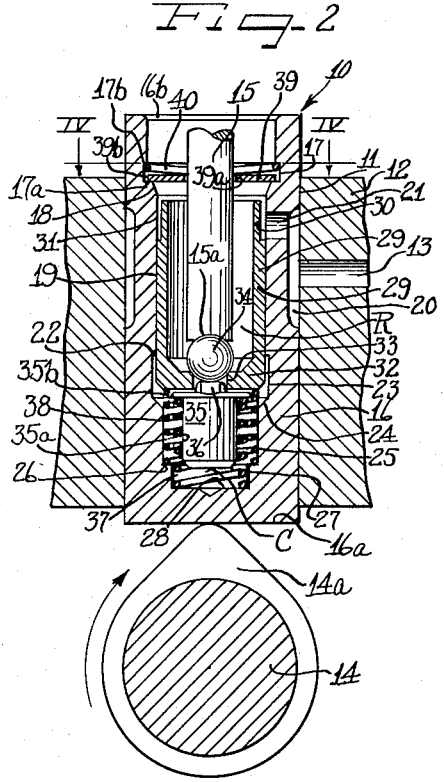
Fig. 2
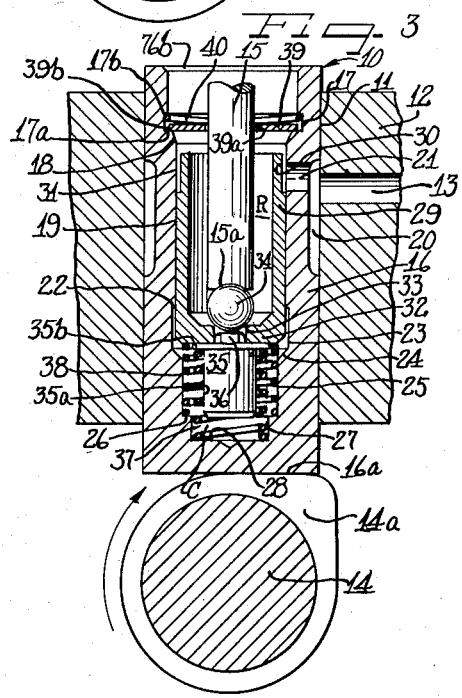
Fig. 3
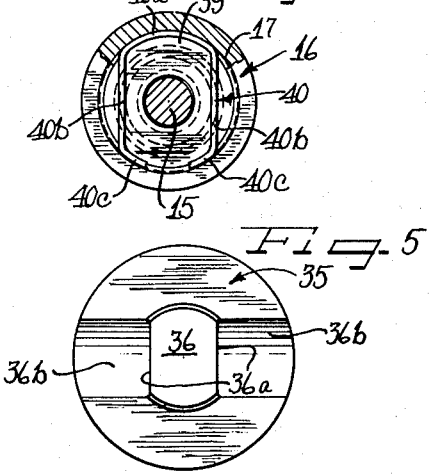
Fig. 4
Fig. 5
Inventor
Herbert H. Engemann

United States Patent Office 2,732,832
Patented Jan. 31, 1956

2,732,832

VALVE LIFTER

Herbert H. Engemann, Cleveland Heights, Ohio, assignor to Thompson Products, Inc., Cleveland, Ohio, a corporation of Ohio Application April 4, 1952, Serial No. 280,531

5 Claims. (Cl. 123—90)

This invention relates to automatic adjusters or regulators for taking up clearance in a linkage assembly or the like without causing the linkage to become unduly tightened. Specifically, this invention deals with a hydraulic valve tappet of the type having telescoped parts including a plunger slidable in a closed bottom body and supported on trapped oil in the body wherein a metal ball valve in the plunger transmits thrust loads and is opened by a spring loaded button in the body for permitting elongation of the assembly and replenishment of oil.

This invention will be specifically hereinafter described as embodied in a hydraulic valve tappet slidably interposed between an actuating cam and a valve stem or push rod of an internal combustion engine, but it should be understood that the devices of this invention are generally useful in controlling clearances in any linkage assembly.

The hydraulic valve tappets of this invention are characterized by thrust load transmitting valves and by orificed plungers or pistons resting on a trapped column of oil or other fluid. The valve is ball shaped and controls an orifice in the bottom of a cup-like plunger or hollow piston which is slidably mounted in a housing having a closed bottom and an open top. The ball valve directly receives the thrust of the poppet valve or push rod. Oil from the engine is received into the hollow plunger and fills the bottom of the body under the plunger. When the valve is closed, the plunger is supported on a solid column of oil and the valve stem or push rod, in turn, is bottomed on the plunger. Some of the trapped oil can leak past the plunger under heavy load, and oil in the bottom of the body is replenished from the interior of the plunger when the valve is opened. The valve is urged to open position by a button mounted on a spring in the bottom of the housing and having a shank extending into the plunger orifice for acting on the ball. This spring, in biasing the button against the ball valve, takes up all looseness or play out of the valve linkage, and, as this play or looseness is taken up, the plunger is moved by virtue of a second or light spring acting on the bottom of the plunger. This light spring is not sufficient to exert more than atmospheric pressure on the plunger so that it cannot create a reduced pressure zone in the trapped oil chamber. If the plunger should become stuck in the housing, due to varnish formation or the like, the heavy spring loading the button is effective to assist the return of the plunger to its proper position until all play is taken out of the valve linkage, whereupon the light spring will become effective to close the valve.

A feature of the invention resides in the provision of an oil seal at the top of the housing which will accommodate misalignment of the valve or push rod, and, at the same time, will prevent undue leakage of oil out of the system.

Another feature of the invention resides in the use of a ball valve to close the orifice in the bottom of the plunger and to directly receive the thrust of the valve linkage thereon.

A still further feature of the invention resides in the provision of a heavy valve opening spring to take up clearance and a supplementary light spring to maintain the valve in closed position but adapted to be supplemented by the heavy spring whenever the plunger becomes stuck.

It is, then, an object of this invention to provide an inexpensive automatic adjuster of the trapped oil type wherein an oil control valve includes a steel ball receiving the direct thrust of the transmitted load.

A further object of the invention is to provide a hydraulic valve adjuster with a valve loaded metal ball controlling flow of oil between a reservoir and a high pressure oil chamber.

A still further object of the invention resides in the provision of an oil seal for a hydraulic valve adjuster which permits lateral adjustment and does not include any boot or wearable bellows arrangement.

Another object of the invention is to provide a snap ring in a tappet housing to form a combination stop and bias for an oil seal.

Another object of the invention is to provide a novel button arrangement in a hydraulic valve tappet to take up play without, however, carrying the load on the tappet.

Other and further objects of the invention will be apparent to those skilled in the art from the following detailed description of the annexed sheet of drawings which, by way of a preferred example only, illustrates one emboiment of the invention.

On the drawings:

Figure 1 is a longitudinal cross-sectional view, with parts in elevation, of a hydraulic valve lifter according to this invention showing the positions of the parts just prior to the valve-opening operation.

Figure 2 is a view similar to Figure 1, but showing the positions of the parts as the valve is fully opened.

Figure 3 is a view similar to Figures 1 and 2 but showing the positions of the parts immediately following the valve opening operation.

Figure 4 is a vertical cross-sectional view, with parts in elevation, taken along the line IV—IV of Figure 2.

Figure 5 is a top plan view, on an enlarged scale, of the button used in the valve lifter.

As shown on the drawings:

The valve lifter 10 of this invention is slidably mounted in the tappet bore 11 of an engine block 12 and receives engine oil from a passageway 13 in the block. A cam shaft 14 acts on the bottom of the tappet 10 and has a lobe 14a for reciprocating the tappet in the bore 11. The tappet, in turn, actuates a push rod or valve stem 15 which controls the position of a poppet valve in the valve linkage (not shown).

The valve lifter 10 has a cylindrical body or barrel 16 with a flat closed bottom 16a acted on by the cam shaft 14 and an open top 16b through which the push rod 15 can freely project.

An undercut groove 17 is provided in the interior of the body 16 in spaced relation from the open top 16b thereof and forms a bottom shoulder 17a and a top shoulder 17b. The bottom shoulder 17a extends radially inward of the shoulder 17b to a diverging or tapered wall 18 merging with an elongated cylindrical bore 19. A relatively wide circumferential groove or depression 20 is provided in the body around the bore 19 thereof to register with the passageway 13 throughout the extent of movement of the body in the tappet bore 11. A radial hole 21 connects the recess or groove 20 with the bore 19.

The bottom of the bore 19 in the body 16 terminates in a sharp outturned radial shoulder 22 extending to a larger diameter bore 23 which depends to an inwardly tapered wall portion 24 which, in turn, extends inwardly to a smaller diameter cylindrical bore 25. The bore 25 terminates in a radial shoulder 26 and the shoulder, in turn, terminates in a cylindrical bore 27 to a bottom wall 28.

A cup-shaped plunger or hollow piston 29 is slidably mounted in the bore 19 and has a reduced diameter open top end 30 providing a recess 31 adapted to receive oil from the hole 21 in the body. The open top of the plunger receives the push rod 15 freely therethrough.

The bottom of the plunger has a flat bottom wall 32 with a central cylindrical bore 33 therethrough providing a passageway. A steel ball 34 rests on the bottom 32 to close the passageway 33 and receives the bottom of the push rod 15 thereon. The bottom of the push rod can have a recess 15a therein to seat the ball 34.

A generally cylindrical button 35 is mounted under the bottom wall 32 of the plunger 29 in the body 16. The button 35 has an elongated cylindrical portion 35a fitting freely in the bores 25 and 27 of the body and terminating in an outturned rim 35b at the upper end thereof. The top of the button has a reduced diameter shank 36 projecting into the passageway 33. As shown in Figure 5, this shank has flat sides 36a. These flat sides extend into the passage 33 but do not mate therewith, so that flow spaces are always provided on both sides of the shank 36. The top of the button also has laterally extending recesses 36b to connect the flow spaces with the sides of the button so that even if the button is seated tightly against the bottom wall 32 of the plunger, oil can flow through the passages adjacent the sides 36a and in the top at 36b.

A heavy coil spring 37 surrounds the cylindrical portion 35a of the button and is bottomed at one end on the rim 35b and at the other end on the bottom wall 28 of the housing. This spring is compressed to take up the clearances in the linkage.

A relatively light coil spring 38 surrounds the spring 37 and is bottomed at one end on the shoulder 26 of the housing and at the other end on the bottom wall 32 of the plunger. This light spring does not exert enough thrust on the plunger to create a subatmospheric pressure in the trapped oil zone in the bottom of the housing as will be more fully hereinafter described, but is effective to cause the plunger to follow the ball 34.

A flat metal washer 39 is mounted in the open top of the housing on the shoulder 17a thereof and has an inner periphery 39a sized for freely receiving the push rod therethrough, together with an outer periphery 39b of smaller diameter than the groove 17, so as to be slidable on the shoulder 17a to accommodate swinging movement of the push rod 15, or any misalignment between the tappet body and the valve linkage.

A generally U-shaped snap ring 40 is seated in the groove 17 above the washer 39 and confined by the top shoulder 17b. As best shown in Figure 4, this snap ring includes a rounded bight portion 40a fitting in the groove 17 and bottomed on the shoulder 17b thereof, a pair of straight legs 40b overlying the washer 39 inwardly from the groove 17 and rounded inturned ends 40c on these legs fitting in the groove 17 and also bottomed on the shoulder 17b thereof. The snap ring is bowed so that the mid-portions of the legs 40b will press against the washer 39 to seat this washer on the shoulder 17a. The snap ring is easily inserted into and removed from the groove 17 and not only coacts with the washer to hold it in position but also affords a stop holding the parts in assembled relation in the body or housing 16.

The hollow plunger or piston provides an oil reservoir R in free communication with the passageway 13 to receive oil from the engine lubricating system. This reservoir R is closed at the top by the washer 39. A trapped oil chamber C is provided in the bottom of the housing 16 under the bottom 32 of the plunger 29. Oil trapped in this chamber C supports the plunger and carries the thrust load during the valve opening operation. The oil is replenished from the reservoir R.

Operation

The engine supplies oil to the reservoir R in the plunger 29 and this reservoir, in turn, supplies oil to the chamber C through the valve passage 33.

The take-up spring 37 acts on the button 35 and the bottom of the bottom wall 28 to maintain the parts in association. The chamber C is initially filled with oil and the light spring 38 is effective to hold the plunger 29 against the ball 34 to close the passageway 33.

As shown in Figure 1, when the ball 34 closes the passage 33, oil is trapped in the chamber C and, as the cam lobe 14a acts on the bottom 16a of the body to raise the body in the tappet bore 11, the plunger 29 is raised with the body on a solid column of trapped oil as illustrated in Figure 2. The plunger, in turn, raises the push rod 15 to open the engine valve. As illustrated in Figure 1, the take-up spring 37 is effective to elongate the assembly and hold the tappet body bottom 16a on the cam. Even in this extended position of the assembly, the top of the plunger is spaced beneath the oil sealing washer so that the reservoir R in the plunger is in free communication with the passageway 13 through the recess 31, the bore 21, and recess 20.

When the tappet 16 is raised to its full valve opening position as shown in Figure 2, the sliding fit of the plunger 29 in the bore 19 will allow some of the trapped oil in the chamber C to leak past the plunger thereby permitting the plunger to slide downwardly in the housing 16 toward the shoulder 24. This downward movement of the plunger permits the push rod 15 and ball 34 to to follow downwardly therewith thereby shortening the assembly. The ball 34, under these conditions, acts as a thrust transmitting member bottomed on the plunger which, in turn, is supported by the trapped column of oil.

After the valve opening operation when the cam lobe permits the body 16 to drop in the tappet bore 12 to the position shown in Figure 3, the load on the trapped oil in the chamber C is removed, and the load on the take-up spring 37 and the follow-up spring 38 is relieved. The take-up spring thereupon becomes effective to elongate the assembly to maintain the bottom 16a of the body on the base circle of the cam shaft 14 while again taking up any looseness or slack in the valve linkage. This relief of load on the valve 34 and elongation of the assembly will momentarily permit connecting the reservoir R with the trapped oil chamber C through the passages 36a and 36b due to the fact that pressure differences in the upper and lower chambers permits the wall 32 to move away from the ball 34. As soon as pressure conditions between the reservoir R and the trapped oil chamber C are equalized, the light spring 38 will became effective to move the plunger back against the ball 34 thereby again closing the chamber C. The light spring is only effective to cause the plunger to follow the ball when the trapped oil chamber is vented to the atmosphere through the open valve passage 33.

In the event that foreign matter becomes lodged between the ball 34 and the bottom wall forming valve seat of the plunger, the passage 33 will be opened and, during the next valve opening operation, the plunger 29 will crash down against the shoulder 24 to subject the interposed foreign matter to the full load of the valve spring, thereupon crushing or dislodging this foreign matter and permitting the ball valve to again seat.

As the plunger 29 slides in the bore 19, it moves past the shoulder 22 which, as explained above, is sharp and acts as a scraper to scrape off any impurities or varnish that may tend to coat the periphery of the plunger. This maintains the plunger in free sliding condition in its bore 19.

In the event that the push rod 15 and valve lifter parts become misaligned, the push rod can swing freely on the ball 34 and the washer 39 can slide freely on the shoulder 17a to accommodate this misalignment without, however, opening up the top of the plunger to oil leakage. The single spring 39 holds the washer on the shoulder and, at the same time, maintains all of the parts in assembled relation.

The ball 34 can, if desired, be integral with the end of the push rod 15.

From the above descriptions, it will, therefore, be understood that this invention provides a simple, inexpensive, hydraulic valve tappet which is efficient in operation and easily assembled.

It will be understood that modifications and variations may be effected without departing from the scope of the novel concepts of the present invention.

I claim as my invention:

1. A hydraulic length adjuster which comprises a hollow body having a closed bottom and an open top with an interior groove adjacent the open top, a hollow plunger slidable in said body and having a passage through the central portion of the bottom thereof and an open top inwardly from said groove, a ball member controlling flow through the passage in said plunger, a button member in said body beneath said plunger having a shank adapted to project into said passage for unseating the ball member, a first spring urging said button member toward the plunger, a second spring acting on said plunger to move the plunger toward said groove in the body, a washer in said body slidably mounted on a shoulder provided at the bottom of the groove in said body, a snap ring in said groove in said body urging said washer against said shoulder, valve actuating stem means extending thru said washer and bottomed on said ball member, and means for feeding oil to the interior of the plunger to flow through the plunger passage into the bottom of the body when the shank of the button unseats the ball member and to support the plunger on oil trapped in the bottom of the body when the ball member closes the passage, whereby force applied to the body will be transmitted through the trapped oil, plunger, and ball member to the stem means and said first spring is effective to unseat the ball when load is relieved from the assembly while elongating the assembly to replenish the trapped oil chamber with oil from the plunger while said second spring urges the plunger against the ball when pressures in the plunger chamber and trapped oil chamber are equalized 2. A hydraulic valve tappet which comprises a hollow open topped closed bottomed body, a hollow plunger slidable in said body having a passage through the bottom wall thereof and an open top, a ball member seatable on said bottom to control flow through said passage, a push rod projecting freely into said open top of the plunger to rest on said ball member, a button member in the body under the plunger having a shank projecting into the passage to unseat the ball member, a take-up spring acting on said button member urging the member in a direction to increase the effective length of the assembly, a weak spring urging the plunger against the ball member, said body having an internal shoulder adjacent the open end thereof, a washer slidably bottomed on said shoulder and adapted to be radially displaced, said washer receiving said push rod therethrough in relatively slidable relation, and a snap ring in said housing acting on said washer to hold said washer on said shoulder, whereby said washer provides an oil seal for said assembly while accommodating displacement of the push rod.

3. A hydraulic valve tappet which comprises a cylindrical body member having a closed bottom, an open top, and a recess around the periphery thereof intermediate the top and bottom together with an aperture joining the recess with the interior thereof, a cup-shaped plunger slidable in said cylindrical body member having a reduced diameter top portion providing a passage joining said aperture in the body with the interior of the plunger, said body having an internal shoulder, a washer slidably mounted on said shoulder, a spring holding said washer on said shoulder, said washer forming a cover for the plunger to prevent leakage of oil out of the body, a push rod extending through said washer into said plunger, valve means at the bottom of said push rod, said plunger having a valve seat on said bottom, a button in said body under said plunger having a shank projecting against said valve means, a take-up spring acting on said button, and a relatively weak spring acting on said plunger, said take-up spring being effective to urge the plunger for unseating the valve when load is relieved on the assembly to replenish oil in the chamber of the body under the plunger and said weak spring being effective to urge the plunger against the valve with a force that is insufficient to create sub-atmospheric pressures in the oil trapped beneath the plunger.

4. In a hydraulic length compensating device of the type having telescoping thrust members with an inner member resting on a body of fluid in an outer member, the improvement which comprises a ball valve in the inner member controlling flow between the members, a push rod bottomed on said ball valve, a radially displaceable seal carried by the outer member receiving said push rod freely therethrough, resilient button means acting on said ball valve to unseat the ball valve when load thereon is relieved, and resilient means acting on said inner member for urging same against said valve for closing the valve.

5. In a valve tappet assembly including a body member, a plunger member slidable in said body member adapted to rest on a body of oil trapped in the body member, and a valve on said plunger controlling flow to said body of oil, the improvement which comprises said body member having an internal recess defining a flat shoulder, a washer of less diameter than said recess bottomed on and radially movable relative to said shoulder, and a snap ring anchored in said recess acting on said washer, said washer forming a stop for said plunger and a self aligning seal for said assembly.

References Cited in the file of this patent

UNITED STATES PATENTS

| | | |
|---|---|---|
| 2,140,826 | Bettison | Dec. 20, 1938 |
| 2,160,257 | Appel | May 30, 1939 |
| 2,309,740 | Voorhies | Feb. 2, 1943 |
| 2,691,367 | Thoren | Oct. 12, 1954 |